United States Patent Office 2,772,317
Patented Nov. 27, 1956

2,772,317
POLYMERIZATION CATALYST AND PROCESSES

John O. Smith, Jr., North Plainfield, and Isidor Kirshenbaum, Union, N. J., assignors to Esso Research and Engineering Company, a corporation of Delaware No Drawing. Application March 28, 1952,
Serial No. 279,207

9 Claims. (Cl. 260—683.15)

The present invention relates to catalysts comprising oxalic acid deposited on a solid adsorbent support. More particularly, it relates to the manufacture of solid oxalic acid catalysts and to the use of these catalysts for polymerizing olefins.

Oxalic acid has been used as a liquid phase catalyst for various types of organic reactions. The liquid material is quite corrosive to the usual metals employed in reaction chambers at the elevated temperatures necessary for conducting the reactions. Furthermore, liquid oxalic acid has a relatively poor catalytic activity at low pressures, especially in the polymerization of light olefins such as the normally gaseous olefins and the like. It is a principal object of the present invention to provide an oxalic acid catalyst that will overcome the above limitations and that will have substantial catalytic activity over a wide range of conditions.

In accordance with the present invention, it has been found that oxalic acid may be deposited on a solid adsorbent support which, after drying, forms a stable material having unexpectedly high catalytic activity. The catalyst composition is non-corrosive to metals, is stable at elevated temperatures, and is quite active for polymerizing olefins even at very low pressures. Furthermore, the solid catalyst demonstrates substantial activity at temperatures well above the melting point of oxalic acid. Even at these high temperatures, there is no apparent tendency for the active catalyst ingredient to sublime or to be otherwise driven off of the solid material.

The catalyst is readily prepared by melting oxalic acid dihydrate and then forming a paste or slurry by adding a solid granular adsorbent material thereto. The paste or slurry may be thoroughly admixed to insure impregnation of the adsorbent with the acid followed by drying at an elevated temperature. The dried solid material may then be granulated or pilled into sizes suitable for use in fixed bed catalytic operations or otherwise sized according to the ultimate needs.

Another method for making the catalyst is to mix solid oxalic acid and adsorbent material, pulverize the mixed mass by a ball mill or other pulverizing means until the solid is thoroughly impregnated with the acid, and then dry and size as outlined above. Another effective procedure involves repeated impregnation of a solid support with warm or hot solutions of oxalic acid in water with partial or complete drying between each impregnation.

The drying operation may be carried out at a temperature in the range of about 200°–400° F., preferably in the range of about 225° to 350° F. Effective water removal may be obtained at lower temperatures provided the drying operation is carried out at a reduced pressure. Excessive drying temperatures are generally undesirable since the oxalic acid may be driven off the solid support before the drying operation is completed. The drying may be carried out in the substantial absence of oxygen or air, especially at the higher temperatures, to avoid oxidation of the oxalic acid. Calcining temperatures at elevated temperatures such as 500° F. or above are to be avoided.

The amount of oxalic acid present in the finished composition may cover a rather wide range. As a rule the composition should contain about 25 to 90%, preferably 50 to 85%, oxalic acid, based on the finished composition. It may be desired in some cases to use malonic acid, but this material is less effective than oxalic acid and is generally no better than chloroacetic acid in catalytic activity.

The supporting materials effective for reacting the solid catalysts may be any one of a variety of solid adsorbent materials. These include the natural and synthetic siliceous adsorbents such as kieselguhr, silica gel, diatomaceous earth and the like. Alumina and aluminum silicates may also be used. These materials include synthetically prepared alumina, fuller's earth, clays such as bentonite, artificially prepared aluminum silicates, and other related materials. The various activated carbons are also useful. As a general rule, siliceous type adsorbents, especially silica gel, are preferred as supports for the catalysts of the present invention.

The activity of the catalyst will depend on several factors. The amount of oxalic acid present in the catalyst will obviously determine the activity of the catalyst to some extent. The type of adsorbent carrying material will have some influence upon the catalytic activity. The various adsorbent carrying materials vary somewhat in their adsorptive capacity and also in their chemical and physical properties and their influence upon the catalytic effect of the mixtures. It is possible that in some cases the solid adsorbent will react to some extent with the oxalic acid to form complex molecules having high catalytic activity and excellent stability at elevated temperatures. The catalytic activity and adsorptive capacity of the supports may be modified by acid treatment with acids such as hydrochloric, hydrofluoric, sulfuric and the like to wash out soluble reaction products before impregnation with oxalic acid. These supports may be precalcined at elevated temperatures such as in the range of about 250° to 1200° F. to improve their mechanical strength. It will be obvious to the skilled workman that other methods of pretreating the catalyst supports may be utilized in order to modify catalyst activity.

Catalyst activity may also be modified by including in the composition small amounts of metals, metallic oxides, metal salts and the like which have a promoting effect on the catalytic reaction in question. Such promoters include the oxides and sulfates of nickel, copper, zinc and the like, or small amounts of platinum employed alone or in combination with one of the other promoters. Other promoters include hydrogen chloride, boron trifluoride, hydrofluoric acid and the like. For example, coordination compounds of boron trifluoride and oxalic acid on the support may be prepared and used effectively. Generally, promoter concentrations will vary in the range of about 0.1 to 15% by weight, based on the finished catalyst.

The solid catalysts of this invention may find application in various types of reactions such as in hydration of olefins to make alcohols, isomerization of hydrocarbons, polymerization of aldehydes and the like. They are most useful, however, as catalysts for polymerization of olefinic hydrocarbons such as the $C_2$—$C_5$ olefins including ethylene, propylene, isobutylene pentylenes or even the higher molecular weight olefins.

Polymerization reactions may be carried out in a fixed bed zone in which gaseous or vaporous olefin feed is continuously passed through a bed of solid granular oxalic acid catalyst at elevated temperature and, if desired, elevated pressure. The catalyst is conveniently supported in a plurality of tubes having a high length to diameter ratio, the tubes being arranged in a steam jacketed housing for facilitating heating of the reaction zone. In this case, catalyst granules or pills having sizes in the range of about 4 to 14 mesh are quite suitable. The reaction is conveniently carried out at a temperature in the range of about 150°–600° F., a range of 200°–450° F. generally being preferred. Reaction pressures may range from atmospheric up to 2000 p. s. i. g. While the oxalic acid catalysts are quite effective at very low pressures, higher olefin conversions, and, hence, better utilization of the equipment, are obtained at pressures above about 500 p. s. i. g.

Olefin feed rates will vary somewhat depending upon the temperature and pressure conditions as well as the concentration of olefins in feed stock. Feed rates in the range of about 0.2 to 20 liquid volumes of feed per volume of catalyst per hour are generally useful when the feed stock contains 30% or higher amounts of olefins. The feed stocks may contain up to 100% olefins. Those containing paraffin diluents with olefin concentrations in the range of about 40 to 80% are usually preferred.

The solid oxalic acid catalyst is susceptible to oxidation by air at elevated temperatures. It is usually desirable to take precautionary measures to remove dissolved air or oxygen from the hydrocarbon feed stock prior to contacting it with the catalyst. The catalyst is also sensitive to poisoning by nitrogen compounds such as ammonia, cyanides and the like and sulfur compounds such as hydrogen sulfide, that may be present in olefin stocks derived from cracking operations and the like. The feed stock may be pretreated for the removal or conversion of these catalyst poisons by washing with acid solutions, caustic solutions, water washing, passage through an adsorbent bed such as silica gel or anhydrous alumina or by other methods known to the art. As a rule the feed stock should contain below 10 parts per million, preferably below about 5 parts per million of nitrogen compounds, oxygen, sulfur compounds, etc. in order to extend the life of the catalyst to useful levels.

The solid oxalic acid catalysts usually have an appreciable vapor pressure. This is especially true when operating at the higher polymerization temperatures. The catalyst, therefore, tends to lose water of hydration and consequently to lose mechanical strength and activity after extended operating periods. In order to compensate for this loss of water, it is generally desirable to maintain a small amount of water in the form of vapor or steam in the reaction zone during the polymerization reaction. By maintaining an amount of water such that its partial vapor pressure in the reactants is substantially equivalent to the vapor pressure of the catalyst, loss of water from the catalyst is minimized and catalyst life is greatly extended. Conveniently, the hydrocarbon feed may contain a small amount of water, the amount being regulated depending on operating temperatures, pressures, catalyst composition and other factors that determine catalyst vapor pressure. As a rule, in the range of about 0.1 to 5% by weight of water in the olefin feed will be sufficient to minimize catalyst dehydration. It is not desirable however to maintain an excessive amount of water in the catalyst zone since the catalyst may become overhydrated resulting in softening and agglomeration thereof. A convenient means for controlling the water rate to the reaction zone is to pass all or a portion of the olefin feed through a body of water at a temperature in the range of about 50° to 200° F. The feed will take up the amount of water needed to prevent dehydration of the catalyst.

The olefin polymerization may be carried out by other procedures. A convenient alternate method is to suspend the solid oxalic acid catalyst in finely divided form (20 to 200 mesh size) in the olefin feed by means of a hindered settler operation or by means of mechanical agitators or the like under desired reaction conditions. This operation is most effective when carried out at high pressures (500 p. s. i. g. or above) at which the reactants are highly dense. The catalyst is also adaptable to low pressure (below 200 p. s. i. g.) fluidized catalyst operations analogous to the fluid catalytic cracking operations so well known to the art. The catalyst may also be agitated as a slurry in a heavy oil or other substantially inert fluid medium and the olefin feed passed therethrough during the polymerization step. Other methods for employing the catalyst will be apparent to those skilled in the art.

The invention will now be illustrated in connection with the following examples which are given for illustrative purposes only and are not to be construed as limiting the invention in any way.

*Example I—Preparation of silica gel base oxalic acid catalyst.*—560 g. of oxalic acid dihydrate (melting point—214° F.) was melted in a flask. 125 g. of silica gel (predried at a temperature of 400° F.) was then added to the melted oxalic acid with stirring. After the silica gel had been thoroughly impregnated with the acid, the material was poured into an evaporating dish and dried with stirring at 250° to 300° F. until the catalyst was solid. The material was granulated and sized to obtain particles having a size in the range of about 2 to 12 mesh.

*Example II—Olefin polymerization studies.*—A series of fixed bed polymerization runs was carried out employing the silica gel base catalyst of Example I. A comparative run was made in which the catalyst was liquid oxalic acid. The $C_3$—$C_4$ olefin feed stock contained about 46 weight percent olefins. The granular catalyst was supported in a bed. The olefin feed was passed downwardly through the catalyst bed at a feed rate of one volume of liquid feed per volume of catalyst per hour. In two of the runs, the olefin feed stock contained a small amount of added water. Olefin conversion determinations were made on the reaction zone effluent after various periods of time.

The run using liquid oxalic acid catalyst was carried out as follows:

Oxalic acid dihydrate was heated up to a temperature of about 220° F. At this temperature a liquid was formed which comprised oxalic acid dissolved in the water of hydration. This material was placed in a reaction zone including a feed distribution plate located at the bottom thereof through which olefins were introduced into the liquid acid as finely divided bubbles. The operation was carried out at atmospheric pressure with the same olefin feed employed in the fixed-bed runs.

Pertinent operating data and olefin conversions obtained in the various runs are shown in the following table:

*Polymerization of olefins using oxalic acid catalysts*

| Catalyst Employed | Solid Oxalic Acid-Silica Gel | | | Liquid Oxalic Acid |
|---|---|---|---|---|
| Run Number | 1 | 2 | 3 | 4 |
| Run Conditions: | | | | |
| Temperature, °F | 212 | 456 | 500 | 220–260 |
| Pressure, p. s. i. g | 20 | 20 | 20 | 0 |
| Feed Rate, Vol. Feed/Vol. Catalyst/Hour | 1.0 | 1.0 | 1.0 | 0.6 |
| Water in Feed, Percent by Weight | 0.2 | 0.5 | 0 | (¹) |
| | Olefin Conversion, Mol Percent | | | |
| Hours On Stream: | | | | |
| 0.25 | 20 | 21 | 23 | <1 |
| 1.0–1.25 | | 26 | 0 | <1 |
| 2.0–2.25 | 20 | <20 | 0 | <1 |
| 3.0 | 24 | <20 | 0 | (²) |

[1] Oxalic acid was dissolved in water of hydration.
[2] Run discontinued.

It is noted that rather high olefin conversions were obtained in runs 1 and 2 when employing the solid oxalic acid catalyst at a pressure of only 20 p. s. i. g. and temperatures of 212° and 456° F. In run 3, a high olefin conversion was initially obtained but dropped off rapidly to substantially zero. A dry feed was used in this run. A small amount of water was present in the feed to runs 1 and 2. Substantial yields of polymer were obtained in both runs 1 and 2. In the case of run 4, olefin conversions were nil when employing the liquid oxalic acid as a catalyst at 220°–260° F. In this run, the olefin feed rate and operating pressure were slightly lower than those employed with the solid catalysts. It is readily apparent from these data that the solid catalysts of the present invention are markedly superior to liquid oxalic acid in the catalytic polymerization of olefins.

The catalysts of the present invention are useful in polymerization of normally gaseous olefins to produce dimers and trimers suitable for inclusion in high octane motor fuels, for making higher molecular weight polymers useful as chemical intermediates and as olefin polymer feed stocks for alkylating aromatic hydrocarbons, and the like. It will be obvious to the skilled workman that the catalyst compositions will have a variety of uses.

What is claimed is:

1. A catalyst composition comprising 25 to 90% by weight of oxalic acid supported on a solid adsorbent material, said composition being formed by impregnating a solid adsorbent material with oxalic acid and then drying the resulting mixture.

2. A composition as in claim 1 in which said adsorbent support is a siliceous material.

3. A composition as in claim 2 in which said siliceous material is silica gel.

4. A polymerization catalyst composition consisting essentially of in the range of about 50 to 85% by weight of oxalic acid impregnated on silica gel, said composition being substantially free of easily removed water.

5. A method for making an olefin polymerization catalyst which comprises the steps of contacting a solid siliceous adsorbent material with liquid oxalic acid dihydrate, thoroughly mixing said materials to impregnate said siliceous material with said acid, drying the resulting mixture at a temperature in the range of about 200°–350° F. to form a solid material, and recovering a polymerization catalyst containing 25 to 90% weight oxalic acid.

6. A method as in claim 5 wherein said siliceous material is silica gel.

7. A method as in claim 6 wherein said silica gel is preheated at a temperature above about 250° F. before contacting with said oxalic acid.

8. A process for polymerizing normally gaseous olefins which comprises contacting the olefins with a substantially dry solid catalyst comprising 25 to 90% by weight oxalic acid supported on a solid siliceous adsorbent material at a temperature in the range of about 200°–450° F. whereby substantial polymerization of olefins takes place.

9. A process as in claim 8 wherein said solid siliceous support is silica gel.

References Cited in the file of this patent

UNITED STATES PATENTS

| | | |
|---|---|---|
| 1,752,721 | Bierce | Apr. 1, 1930 |
| 2,181,640 | Deanesly et al. | Nov. 28, 1939 |
| 2,245,143 | Gerhold | June 10, 1941 |
| 2,339,349 | Morey | Jan. 18, 1944 |
| 2,453,740 | Becker | Nov. 16, 1948 |

OTHER REFERENCES

Journal of Physical Chemistry, article by P. H. Dewey, vol. 36, pages 3187–8, 1932.